UNITED STATES PATENT OFFICE.

DANIEL M. McCARTHY, OF BROOKLYN, NEW YORK.

FORMALDEHYDE COMPOSITION AND THE PREPARATION THEREOF.

1,265,463. Specification of Letters Patent. Patented May 7, 1918.

No Drawing. Application filed December 17, 1915. Serial No. 67,381

*To all whom it may concern:*

Be it known that I, DANIEL M. McCARTHY, a subject of the King of England, and a resident of the city of New York, borough of Brooklyn, in the county of Kings and State of New York, have invented a new and Improved Formaldehyde Composition and the Preparation Thereof, of which the following is a full, clear, and exact description.

My invention relates to a composition of matter for sterilizing, disinfecting, and medicinal purposes. An object of the invention is to provide a homogeneous, consistent mass including formaldehyde adapted to emanate from the mass to sterilize or disinfect the surrounding atmosphere. A further object of the invention is to provide a composition of matter of the class described which is compressible and easily deformed, whereby it can be shaped into any desired form or stored in containers of any configuration. A still further object of the invention is to provide a simple, inexpensive and expeditious method of preparing the composition of matter.

I am aware that solids containing formaldehyde have been previously obtained, but the purpose of incorporating the formaldehyde is to disinfect the composition formed, and not to produce a composition from which formaldehyde will emanate to sterilize the surrounding atmosphere. Such a composition containing formaldehyde was most commonly in the form of a soap, the incorporated formaldehyde forming a disinfectant for the soap so as to prevent contamination by the use of the soap by different persons.

A solution of formaldehyde as hitherto employed for sterilization has the defect of emanating the formaldehyde from the solution nonuniformly but inversely proportional to the time it is exposed. That is to say, when the solution is fresh the emanation is very rapid and the sterilizing and disinfecting effects thereof are very great, but after awhile its efficiency is so materially impaired that the said solution has substantially no sterilizing or disinfecting properties. Furthermore, a solution of formaldehyde cannot be used conveniently in portable containers to be maintained sterilized, for the solution may be spilled.

To obviate the above defects I have produced a homogeneous consistent mass containing formaldehyde which will emanate so uniformly that its sterilizing and disinfecting properties are substantially uniform through a long period of time as compared with a solution of formaldehyde. Being a consistent mass it can be used in any container without danger of being spilled. Further, the mass being compressible and easily shaped permits the partial filling of a container without danger of the mass moving within the container. This mass has, further, adhesive qualities, so that the same can be easily attached to a surface without danger of said mass moving thereupon.

My composition is formed of a consistent, jelly-like mass adapted to absorb a large quantity of water and formaldehyde. The jelly-like mass is non-albuminous and preferably of vegetable origin, containing gelose and pertaining to the class of water algæ. Particularly, use is made of agar-agar, also known as Japanese isinglass. The composition is formed as follows: For each one hundred grams of cold water five grams of agar-agar is used. The same is digested in the cold water for a few hours and then heated, causing the agar-agar to dissolve in the water. To the so-dissolved solution one hundred grams of 40% solution of formaldehyde is added, the solution of agar-agar being stirred during the addition of the formaldehyde. The mixture is then poured into any desired molds and allowed to set. Any desired coloring matter inert to the formaldehyde and agar-agar may be added while the mass is fluid, the coloring matter giving to the composition a nicer appearance without in any way impairing the qualities thereof. The coloring matters I prefer to use are the anilin dyes. The composition when set is plastic, slightly compressible and of such a consistency that it will keep any shape given to it. It can be easily forced into vessels of various forms and will occupy any part thereof without moving therein, for the jelly-like substance is of adhesive nature, causing it to stick on the surface where it is placed.

While the above proportions of ingredients forming the composition give the best results, variations in said proportions can be made without materially impairing the efficiency of the compound. With vegetable gelose containing substances the quantity of formaldehyde can be greatly reduced, particularly when said gelose containing substances are utilized as laxatives.

A large number of tests with the composition has shown that the emanation of formaldehyde from the jelly-like substance is substantially uniform for a long period of time. The exact reasons are not clear, but it is presumed that it is due to the absorbative qualities of the jelly-like substance.

I claim:

1. A new composition of matter consisting of a 5% solution of agar-agar mixed with a 40% solution of formaldehyde, in equal proportions.

2. A new composition of matter consisting of a 5% solution of vegetable substance containing gelose, and a 40% solution of formaldehyde, in equal proportions.

In testimony whereof I have signed my name to this specification in the presence of two subscribing witnesses.

DANIEL M. McCARTHY.

Witnesses:
EUGENE DUTZ,
JOHN WATT.